(12) United States Patent
Laksono et al.

(10) Patent No.: US 9,805,267 B2
(45) Date of Patent: Oct. 31, 2017

(54) VIDEO PROCESSING SYSTEM WITH PHOTO GENERATION AND METHODS FOR USE THEREWITH

(71) Applicant: ViXS Systems, Inc., Toronto (CA)

(72) Inventors: Indra Laksono, Richmond Hill (CA); Sally Jean Daub, Toronto (CA); John Pomeroy, Markham (CA); Xu Gang Zhao, Maple (CA)

(73) Assignee: ViXS Systems, Inc., Toronto (CA)

( * ) Notice: Subject to any disclaimer, the term of this patent is extended or adjusted under 35 U.S.C. 154(b) by 0 days.

(21) Appl. No.: 14/677,114

(22) Filed: Apr. 2, 2015

(65) Prior Publication Data

US 2015/0278606 A1 Oct. 1, 2015

Related U.S. Application Data

(63) Continuation-in-part of application No. 14/590,303, filed on Jan. 6, 2015, which is a continuation-in-part of application No. 14/217,867, filed on Mar. 18, 2014, and a continuation-in-part of application No. 14/477,064, filed on Sep. 4, 2014, application No. 14/677,114, filed on Apr. 2, 2015, which is a continuation-in-part of application No. 13/467,522, filed on May 9, 2012, now abandoned.

(60) Provisional application No. 61/635,034, filed on Apr. 18, 2012.

(51) Int. Cl.
| | |
|---|---|
| *H04N 7/18* | (2006.01) |
| *G06K 9/00* | (2006.01) |
| *G06F 17/30* | (2006.01) |
| *H04N 21/44* | (2011.01) |
| *H04N 21/81* | (2011.01) |

(52) U.S. Cl.
CPC ..... *G06K 9/00744* (2013.01); *G06F 17/3079* (2013.01); *H04N 21/44008* (2013.01); *H04N 21/8153* (2013.01)

(58) Field of Classification Search
CPC .................. G06K 9/00744; G06F 17/3079
USPC .................. 348/143–160; 375/240.01–240.29
See application file for complete search history.

(56) References Cited

U.S. PATENT DOCUMENTS

| | | | | |
|---|---|---|---|---|
| 2007/0237360 | A1* | 10/2007 | Irie | G06K 9/00261 382/103 |
| 2008/0292299 | A1* | 11/2008 | Kretz | H04N 5/23219 396/263 |
| 2009/0096927 | A1* | 4/2009 | Camp, Jr. | G06K 9/3241 348/613 |

(Continued)

OTHER PUBLICATIONS

"Photography Magic" (10 Top Photography Composition Rules, pub. 2011, available at http://www.photographymad.com/pages/view/10-top-photography-composition-rules).*

(Continued)

*Primary Examiner* — Andy Rao
(74) *Attorney, Agent, or Firm* — Garlick & Markison; Bruce E. Stuckman

(57) ABSTRACT

A system for processing a video signal into a processed video signal includes a video codec configured to generate a processed video signal based on the image sequence. A photo generation module is configured to recognize an object of interest in the image sequence and generate photo data from a selected image in the image sequence that includes the object of interest.

17 Claims, 9 Drawing Sheets

(56) References Cited

U.S. PATENT DOCUMENTS

2012/0195370 A1* 8/2012 Guerrero .............. H04N 19/196
                                              375/240.02
2015/0268822 A1* 9/2015 Waggoner ............. G06F 3/0488
                                              715/722

OTHER PUBLICATIONS

"Improve Photography" (10 Tips for Stunning Action Photography, pub. 2011, available at http://improvephotography.com/736/10-tips-for-capturing-action-packed-moments/).*

* cited by examiner

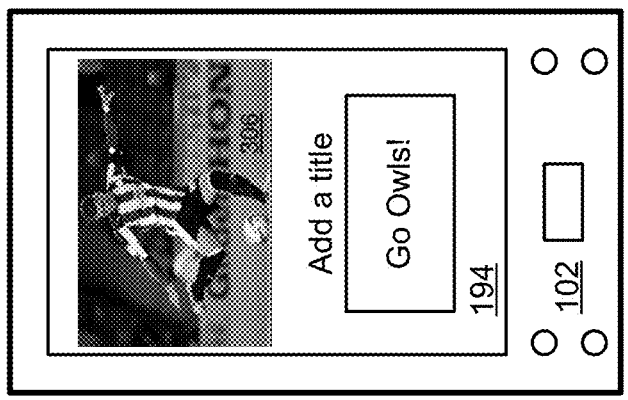
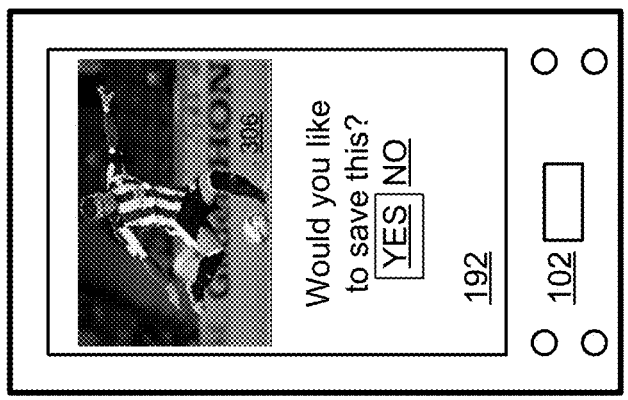
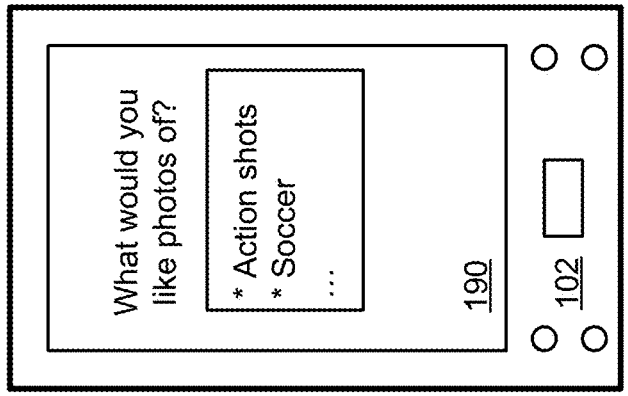
FIG. 8

VIDEO PROCESSING SYSTEM WITH PHOTO GENERATION AND METHODS FOR USE THEREWITH

CROSS REFERENCE TO RELATED PATENTS

The present application claims priority under 35 U.S.C. 120 as a continuation-in-part of U.S. Utility application Ser. No. 13/467,522, entitled, "VIDEO PROCESSING SYSTEM WITH PATTERN DETECTION AND METHODS FOR USE THEREWITH," filed on May 9, 2012, which claims priority pursuant to 35 U.S.C. §119(e) to U.S. Provisional Application No. 61/635,034, entitled, "VIDEO PROCESSING SYSTEM WITH PATTERN DETECTION AND METHODS FOR USE THEREWITH," filed on Apr. 18, 2012, all of which are hereby incorporated herein by reference in their entirety and made part of the present U.S. Utility patent application for all purposes.

The present U.S. Utility patent application also claims priority pursuant to 35 U.S.C. §120 as a continuation-in-part of U.S. Utility application Ser. No. 14/590,303, entitled "AUDIO/VIDEO SYSTEM WITH INTEREST-BASED AD SELECTION AND METHODS FOR USE THEREWITH", filed Jan. 6, 2015, which is a continuation-in-part of U.S. Utility application Ser. No. 14/217,867, entitled "AUDIO/VIDEO SYSTEM WITH USER ANALYSIS AND METHODS FOR USE THEREWITH", filed Mar. 18, 2014, and claims priority pursuant to 35 U.S.C. §120 as a continuation-in-part of U.S. Utility application Ser. No. 14/477,064, entitled "VIDEO SYSTEM FOR EMBEDDING EXCITEMENT DATA AND METHODS FOR USE THEREWITH", filed Sep. 4, 2014, all of which are hereby incorporated herein by reference in their entirety and made part of the present U.S. Utility patent application for all purposes.

TECHNICAL FIELD OF THE DISCLOSURE

The present disclosure relates to video processing used in devices such as video cameras, encoders, decoders and transcoders.

DESCRIPTION OF RELATED ART

Video cameras have become prevalent consumer goods. Not only do many consumers own a standalone video camera, but most consumers include own devices such as smartphones, laptop computers or tablets that include a video camera. Captured video can be encoded for transmission or storage.

Video encoding has become an important issue for modern video processing devices. Robust encoding algorithms allow video signals to be transmitted with reduced bandwidth and stored in less memory. Standards have been promulgated for many encoding methods including the H.264 standard that is also referred to as MPEG-4, part 10 or Advanced Video Coding, (AVC). Encoding algorithms have been developed primarily to address particular issues associated with broadcast video and video program distribution.

Further limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

FIG. 8 presents pictorial diagram representation of screens displays in accordance with a further embodiment of the present disclosure.

DETAILED DESCRIPTION OF THE DISCLOSURE INCLUDING THE PRESENTLY PREFERRED EMBODIMENTS

Figure 1:
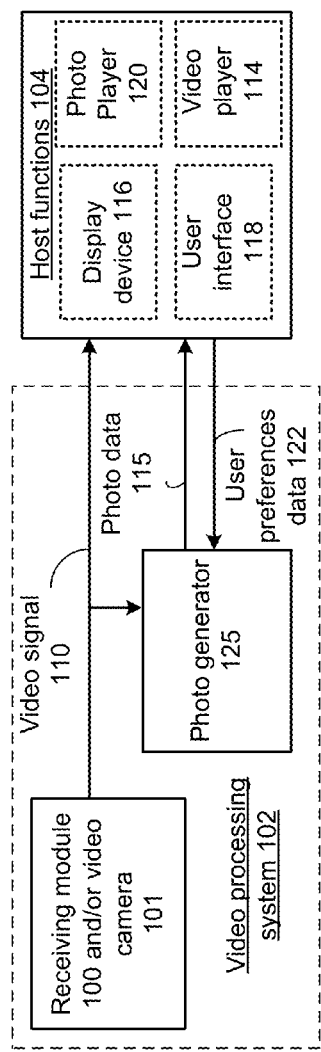
FIG. 1 presents a block diagram representation of a video processing system 102 in accordance with an embodiment of the present disclosure.

FIG. 1 presents a block diagram representation of a video processing system 102 in accordance with an embodiment of the present disclosure. The processing system 102 includes a receiving module 100 or video camera 101. The receiving module 100, can be a receiver or network interface that is part of a video server, set-top box, television receiver, personal computer, cable television receiver, satellite broadcast receiver, broadband modem, 3G transceiver, network node, cable headend or other interface, information receiver or transceiver that is capable of receiving one or more video signals 110 from one or more sources such as video content providers, a broadcast cable system, a broadcast satellite system, the Internet, a digital video disc player, a digital video recorder, or other video source. The video camera 101 can include a lens and digital image sensor such as a charge coupled device (CCD), complementary metal oxide semiconductor (CMOS) device or other video capture device that produces the video signal 110.

In an embodiment of the present disclosure, the video signals 110 can include a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, the video signals 110 can be generated by video camera 101, from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can be a digital audio/video signal in an uncompressed digital audio/video format such as high-definition multimedia interface (HDMI) formatted data, International Telecommunications Union recommendation BT.656 formatted data, inter-integrated circuit sound (I2S) formatted data, and/or other digital AN data formats. The video signal 110 can be a digital video signal decoded by the receiving module 100 from a compressed digital video format such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In addition, the receiving module 100 can optionally unpack the video signal 110 from a transport or container format and/or decrypt the video signal 110. Examples of such container formats are encrypted Internet Protocol (IP) packets such as used in IP TV, Digital Transmission Content Protection (DTCP), etc. Other examples of container formats include encrypted TS streams used in Satellite/Cable Broadcast, etc. In these cases, the payload of TS packets can contain packetized elementary stream (PES) packets. Further, digital video discs (DVDs) and Blu-Ray Discs (BDs) utilize PES streams where the payload of each PES packet is encrypted.

The video processing system 102 also includes a photo generator 125 that recognizes one or more objects of interest in an image sequence of the video signal 110 and generates photo data 115 from a selected image in the image sequence that includes the object(s) of interest. In this fashion, photographs (photos) can automatically be generated from video images such as broadcast video, video clips, video from a video camera or other videos of interest.

As shown, the video signal 110 can be used by a host device or other device that includes host functions 104 such as a video player 114, a display device 116, a user interface 118 and/or photo player 120 and optionally other host functions. For example, the video player 114 can operate in response to user commands received via user interface 118 to receive the video signal 110 and to decode or otherwise process the video signal 110 for display on the display device 116. The photo data 115 can be used by a photo player 120 that operates in response to user commands received via user interface 118 to receive the photo data 115 and to decode or otherwise process the photo data 115 for display on the display device 116.

In particular, the photo generator 125 recognizes an object of interest in an image sequence of a video signal, such as a person, a place, a thing, or an activity that is either specified by a user via user preferences data 122 or based on default parameters that indicate objects such as famous persons, famous places, famous things or activities of wide viewer interest. For example, the photo generator 125 can operate via clustering, syntactic pattern recognition, template analysis or other image, video or audio recognition techniques to search for and identify objects of interest contained in the plurality of shots/scenes or other segments of the video signal 110.

In an embodiment, the photo generator 125 recognizes an object of interest based on color histogram data and further based on audio data and other image data such as object shapes, textures, and other patterns. For digital video, a color histogram is a representation of the distribution of colors in the frame(s). It represents the number of pixels that have same color or color range. The color histogram can be built for any kind of color space such as Monochrome, RGB, YUV or HSV. Each space has its feature and certain application scope. Like other kinds of histograms, the color histogram is a statistic that can be viewed as an approximation of an underlying continuous distribution of colors values. Thus the color histogram is relatively invariant with camera transformation. The size of color histogram is decided only by the color space configuration, which makes it provide a compact summarization of the video in spite of pixel number. For all the above reasons, color histogram is a good low-level feature for video content analysis.

The photo generator 125 can recognize an object of interest based on individual images in the image sequence delineated by shots, scenes, a group of pictures (GOP) or other time periods corresponding to a particular event or action. For example, an object of interest can be recognised in a group of images that delineate the start and stop of a play that includes a touchdown in a football game or a hit in baseball game.

In addition to merely recognizing an object of interest in a video image, the photo generator 125 can include a photo composition module that determines a selected image in a video image sequence by determining that the selected image includes one or more objects of interest and further that the selected image conforms to at least one of a plurality of photo composition rules. The photo composition rules can include, for example, a rule of thirds or other rule based on a relative position of the object or objects of interest in the selected image. The photo composition rules can includes a color rule, texture rule, a perspective rule, a simplicity rule or other rule that compares the object(s) of interest to the content of the background. In addition, the motion trajectory corresponding to an object of interest can be used in conjunction with a room for motion rule, a rule of leading lines or other rule to select a well-composed photo.

In an embodiment, user preferences data 122 can include a database of unique identifiers that correspond to particular objects to be searched for and possibly identified in video signal 110 being analyzed. If a user wishes to see sunrises, he/she can interact with a user interface 118 and generate user preferences data 122 and receive photo data 115 that contain well-composed photos of sunrises. In a similar fashion, if he wishes to see "Gandalf riding a horse", the images of the video signal 110 can be searched to select appropriate images and generate photo data 115 that contain well-composed photos of Gandalf with a horse, etc.

While the video signal 110 and photo data 115 are shown separately, in an embodiment, the photo data 115 can be included in the video signal 110, for example, with other metadata of the video signal. Further, while the video processing system 102 and the host functions 104 are shown separately, in other embodiments, the video processing system 102 and the host functions 104 can be implemented in the same device, such as a personal computer, tablet, smartphone, or other device. Further examples of the video processing system 102 and host functions 104 including several optional functions and features are presented in conjunctions with FIGS. 2-15 that follow.

Figure 2:
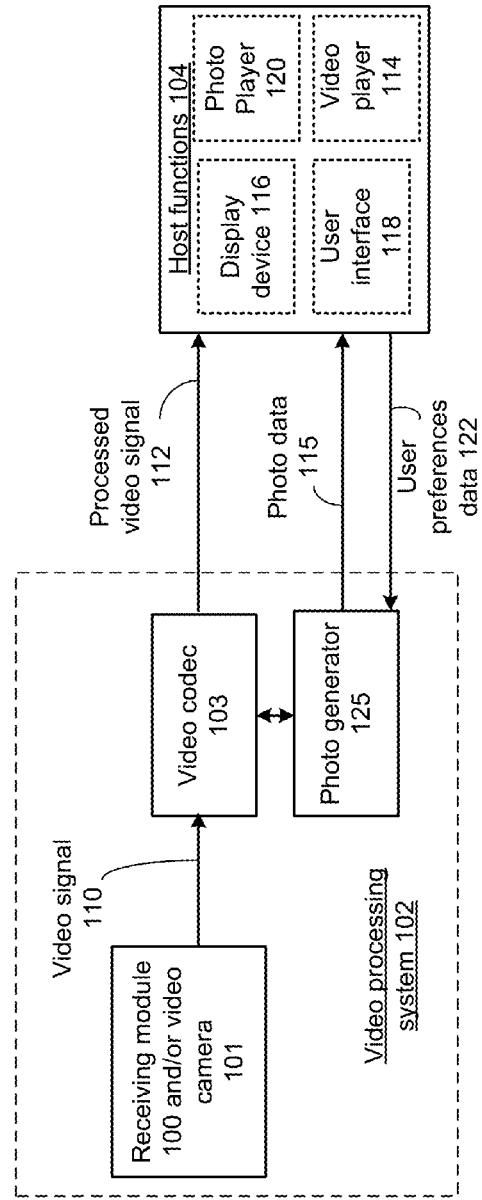
FIG. 2 presents a block diagram representation of a video processing system 102 in accordance with an embodiment of the present disclosure.

FIG. 2 presents a block diagram representation of a video processing system 102 in accordance with an embodiment of the present disclosure. While, in other embodiments, the photo generator 125 can be implemented in other ways, in the embodiment shown, the photo generator 125 is implemented in a video processing system 102 that is coupled to the receiving module 100 or video camera 101 and that includes a video codec configured to encode, decode and/or transcode the video signal 110 to form processed video signal 112 via the operation of video codec 103. In an embodiment, the video processing system 102 processes a video signal 110 received by a receiving module 100 or video camera 101 into a processed video signal 112 for use by a video player 114 and generates photo data 115 as described in conjunction with FIG. 1.

Video encoding/decoding and pattern recognition are both computational complex tasks, especially when performed on high resolution videos. Some temporal and spatial information, such as motion vectors and statistical information of blocks and shot segmentation are useful for both tasks. So if the two tasks are developed together, they can share information and economize on the efforts needed to implement these tasks. As previously described, the photo generator 125 generates photo data 115 based on the selection of an image in an image sequence that contains one or more objects of interest. In particular, the photo generator 125 recognizes the object of interest and/or selects a well-composed image based on coding feedback data from the video codec 103.

In an embodiment, the video codec 103 generates the coding feedback data in conjunction with the processing of the image sequence. Color histogram data generated by the video codec 103 can be provided as coding feedback data that is used by the photo generator 125 in either detecting objects of interest or evaluating images to select a well-composed image. Further, the video codec 103 can generate shot transition data that identifies the temporal segments in the video signal corresponding to a plurality of shots. The photo generator 125 can generate the photo data 115 based on shot transition data that identifies temporal segments in the video signal corresponding to the plurality of shots. For example, shot transition information that identifies temporal segments in the image sequence corresponding to a plurality of video shots, group of picture structure, scene transitions and/or other temporal information from encoding or decoding that identifies transitions between video shots in an image sequence can be used to delineate an image sequence into segments and/or to start new pattern detecting and reorganization and provide points of demarcation for temporal recognition across a plurality of images.

In addition to color histogram data and shot transition data, other coding feedback generated by the video codec 103 in the video encoding/decoding or transcoding can be employed to aid the process of recognizing the content in the processed video signal 112. For example, while temporal and spatial information is used by video codec 103 to remove redundancy, this information can also be used by photo generator 125 to detect or recognize features like sky, grass, sea, wall, buildings and building features such as the type of building, the number of building stories, etc., moving vehicles and animals (including people). Temporal feedback in the form of motion vectors estimated in encoding or retrieved in decoding (or motion information gotten by optical flow for very low resolution) can be used by photo generator 125 for motion-based pattern partition or recognition via a variety of moving group algorithms. In addition, temporal information can be used by photo generator 125 to improve recognition by temporal noise filtering, providing multiple picture candidates to be selected from for recognition of the best image in an image sequence, as well as for recognition of temporal features over a sequence of images. Spatial information such as statistical information, like variance, frequency components and bit consumption estimated from input YUV or retrieved for input streams, can be used for texture based pattern partition and recognition by a variety of different classifiers. More recognition features, like structure, texture, color and motion characters can be used for precise pattern partition and recognition. For instance, line structures can be used to identify and characterize manmade objects such as building and vehicles. Random motion, rigid motion and relative position motion are effective to discriminate water, vehicles and animals respectively.

In addition, feedback from the photo generator 125 can be used to guide the encoding or transcoding performed by video codec 103. After pattern recognition, more specific structural and statistically information can be retrieved that can guide mode decision and rate control to improve quality and performance in encoding or transcoding of the video signal 110. Pattern recognition can also generate feedback that identifies regions with different characteristics. These more contextually correct and grouped motion vectors can improve quality and save bits for encoding, especially in low bit rate cases. After pattern recognition, estimated motion vectors can be grouped and processed in accordance with the feedback. In particular, pattern recognition feedback can be used by video codec 103 for bit allocation in different regions of an image or image sequence in encoding or transcoding of the video signal 110. With pattern recognition and the codec running together, they can provide powerful aids to each other.

Video signal 110 and processed video signal 112 can each be differing ones of an analog audio/video (A/V) signal that is formatted in any of a number of analog video formats including National Television Systems Committee (NTSC), Phase Alternating Line (PAL) or Sequentiel Couleur Avec Memoire (SECAM). The video signal 110 and/or processed video signal 112 can each be a digital audio/video signal in an uncompressed digital audio/video format such as high-definition multimedia interface (HDMI) formatted data, International Telecommunications Union recommendation BT.656 formatted data, inter-integrated circuit sound (I2S) formatted data, and/or other digital AN data formats.

The video signal 110 and/or processed video signal 112 can each be a digital video signal in a compressed digital video format such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. When video signal 110 is received as digital video and/or processed video signal 112 is produced in a digital video format, the digital video signal may be optionally encrypted, may include corresponding audio and may be formatted for transport via one or more container formats.

Figure 3:
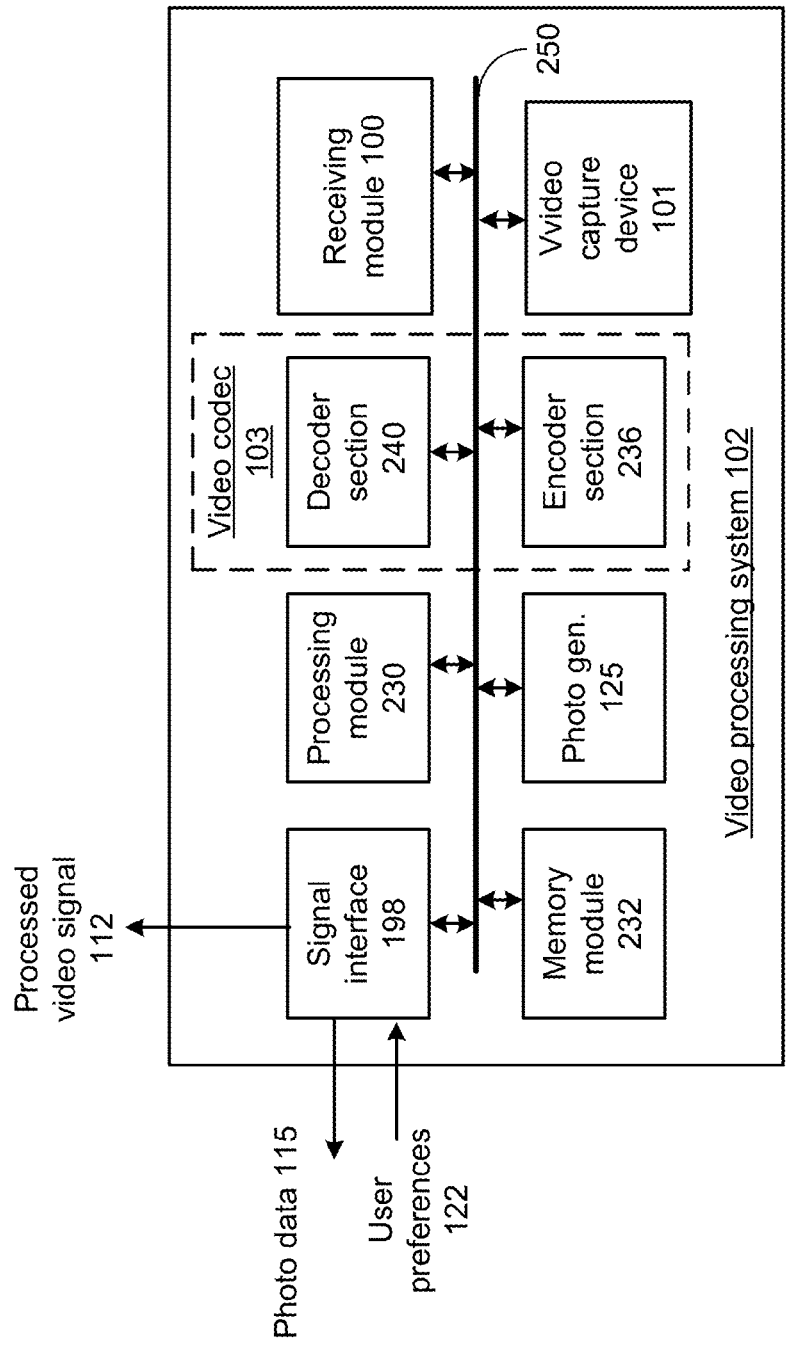
FIG. 3 presents a block diagram representation of a video processing system 102 in accordance with an embodiment of the present disclosure.

FIG. 3 presents a block diagram representation of a video processing system 102 in accordance with an embodiment of the present disclosure. In particular, video processing system 102 includes a video codec 103 having decoder section 240 and encoder section 236 that operates in accordance with many of the functions and features of the H.264 standard, H.265 standard, the MPEG-4 standard, VC-1 (SMPTE standard 421M) or other standard, to decode, encode, transrate or transcode video signals, such as video signals 110 described in conjunction with FIGS. 1 and 2, that are received via receiving module 100 or from video camera 101 to generate the processed video signal 112.

In conjunction with the encoding, decoding and/or transcoding of the video signal received via receiving module 100 or from video camera 101, the video codec 103 generates or retrieves the decoded image sequence of the content of video signal along with coding feedback for transfer to the photo generator 125. The photo generator 125 operates based on the image sequence to generate photo data 115 and optionally pattern recognition feedback for transfer back to the video codec 103. In particular, photo generator 125 can operate via clustering, statistical pattern recognition, syntactic pattern recognition or via other pattern detection algorithms or methodologies to detect a pattern in an image or image sequence (frame or field) of video signal, received via receiving module 100 or from video camera 101, corresponding to an object of interest and generate pattern recognition data and photo data 115 in response thereto. As previously discussed, the object of interest can be specified based on user preferences 122 received via the signal interface or other default parameters.

The photo data 115 can be output via the signal interface 198 in association with the processed video signal 112. As previously discussed, the photo data 115 can be provided separately, or as metadata to the processed video signal 112 that is incorporated in the signal itself as a watermark, video blanking signal or as other data embedded within the processed video signal 112. The signal interface 198 can include one or more parallel or serial wired interfaces, wireless interfaces or other input/output interfaces.

The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230 and memory module 232 are coupled, via bus 250, to the signal interface 198 and a plurality of other modules, such as photo generator 125, receiving module 100, video camera 101, decoder section 240 and encoder section 236. In an embodiment of the present disclosure, the signal interface 198, video codec 103 and photo generator 125 each operate in conjunction with the processing module 230 and memory module 232. The modules of video processing system 102 can each be implemented in software, firmware or hardware, depending on the particular implementation of processing module 230. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

Figure 4:
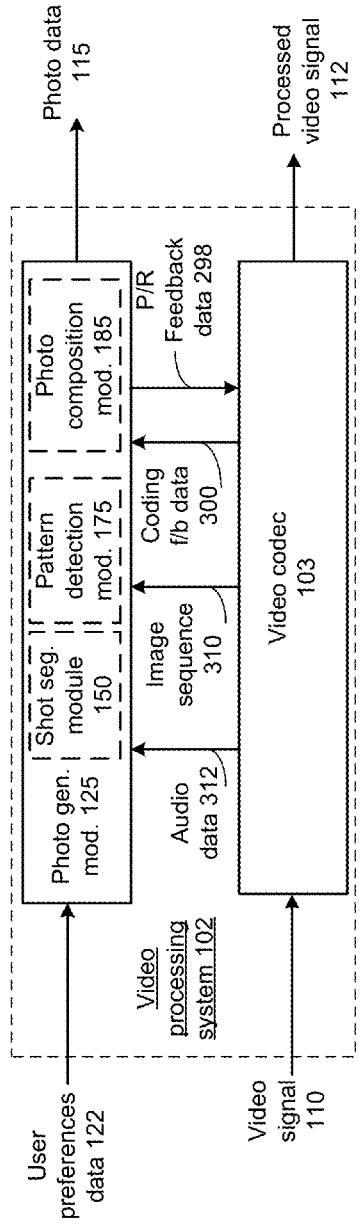
FIG. 4 presents a block diagram representation of a video processing system 102 in accordance with an embodiment of the present disclosure.

FIG. 4 presents a block diagram representation of a video processing system 102 in accordance with an embodiment of the present disclosure. As previously discussed, the video codec 103 generates the processed video signal 112 based on the video signal 110, retrieves or generates an image sequence 310 and further generates coding feedback data 300. The coding feedback data 300 can include shot transition data and other temporal or spatial encoding information, and/or color histogram data corresponding to a plurality of images in the image sequence 310.

The photo generator 125 includes a shot segmentation module 150 that segments the image sequence 310 into shot data 154 corresponding to the plurality of shots, scenes or other segments, based on the coding feedback data 300. In an embodiment, the shot segmentation module 150 operates based on coding feedback data 300 that includes shot transition data 152 generated, for example, by preprocessing information, like variance and downscaled motion cost in encoding; and based on reference and bit consumption information in decoding. Shot transition data 152 can not only be included in coding feedback data 300, but also generated by video codec 103 for use in GOP structure decision, mode selection and rate control to improve quality and performance in encoding.

For example, encoding preprocessing information, like variance and downscaled motion cost, can be used for shot segmentation. Based on their historical tracks, if variance and downscaled motion cost change dramatically, an abrupt shot transitions happens; when variances keep changing monotonously and motion costs jump up and down at the start and end points of the monotonous variance changes, there is a gradual shot transition, like fade-in, fade-out, dissolve, and wipe. In decoding, frame reference information and bit consumption can be used similarly. The output shot transition data 152 can be used not only for GOP structure decision, mode selection and rate control to improve quality and performance in encoding, but also for temporal segmentation of the image sequence 310 and as an enabler for frame-rate invariant shot level object recognition.

A pattern detection module 175 analyzes the shot data 154 to search for objects of interest in the images of the image sequence based optionally on user preferences 122, audio data 312, and further based on the coding feedback data 300. The pattern detection module 175 generates pattern recognition data 156 that identifies objects of interest when present in one of the plurality of shots along with the specific location of the object(s) of interest by image and by location within the image.

In an embodiment, the pattern detection module 175 tracks a candidate facial region over the plurality of images and detects a facial region based on an identification of facial motion in the candidate facial region over the plurality of images, wherein the facial motion includes at least one of: eye movement; and the mouth movement. In particular, face candidates can be validated for face detection based on the further recognition by pattern detection module 175 of facial features, like eye blinking (both eyes blink together, which discriminates face motion from others; the eyes are symmetrically positioned with a fixed separation, which provides a means to normalize the size and orientation of the head), shape, size, motion and relative position of face, eyebrows, eyes, nose, mouth, cheekbones and jaw. Any of these facial features can be used extracted from the shot data 154 and used by pattern detection module 175 to eliminate false detections and further used by photo composition module 185 to determine if a subject is smiling, blinking, etc. Further, the pattern detection module 175 can employ temporal recognition to extract three-dimensional features based on different facial perspectives included in the plurality of images to improve the accuracy of the recognition of the face. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted and further used to determine if a subject is smiling, blinking, etc. The pattern detection module 175 also can employ temporal recognition to extract three-dimensional features of faces and other objects of interest to determine the perspective of object, one or more leading lines, lines of motions, etc. These additional features can be used by the photo composition module 185 in applying one or more photo composition rules to select a well-composed photo.

In this mode of operation, the pattern detection module 175 generates pattern recognition data that can include an indication that human was detected, a location of the region of the human and pattern recognition data that includes, for example human action descriptors and correlates the human action to a corresponding video shot. The pattern detection module 175 can subdivide the process of human action recognition into: moving object detecting, human discriminating, tracking, action understanding and recognition. In particular, the pattern detection module 175 can identify a plurality of moving objects in the plurality of images. For example, motion objects can be partitioned from background. The pattern detection module 175 can then discriminate one or more humans from the plurality of moving objects. Human motion can be non-rigid and periodic. Shape-based features, including color and shape of face and head, width-height-ratio, limb positions and areas, tile angle of human body, distance between feet, projection and contour character, etc. can be employed to aid in this discrimination. These shape, color and/or motion features can be recognized as corresponding to human action via a classifier such as neural network. The action of the human can be tracked over the images in a shot and a particular type of human action can be recognized in the plurality of images. Individuals, presented as a group of corners and edges etc., can be precisely tracked using algorithms such as model-based and active contour-based algorithm. Gross moving information can be achieved via a Kalman filter or other filter techniques. Based on the tracking information, action recognition can be implemented by Hidden Markov Model, dynamic Bayesian networks, syntactic approaches or via other pattern recognition algorithm.

In an embodiment, the pattern detection module operates based on a classifier function that maps an input attribute vector, $x=(x1, x2, x3, x4, \ldots, xn)$, to a confidence that the input belongs to a class, that is, $f(x)=$confidence(class). The input attribute data can include a color histogram data, audio data, image statistics, motion vector data, other coding feedback data 300 and other attributes extracted from the image sequence 310. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. This makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module.

It should be noted that classifier functions containing multiple different kinds of attribute data can provide a powerful approach to recognition. In one mode of operation, the pattern detection module 175 can recognize content that includes an object, based on color histogram data corresponding to colors of the object and sound data corresponding to a sound of the object and optionally other features. For example, a Coke bottle or can be recognized based on a distinctive color histogram, a shape corresponding to a bottle or can, the sound of a bottle or can being opened, and further based on text recognition of a Coca-Cola label.

In another mode of operation, the pattern detection module 175 can recognize content that includes a human activity, based on color histogram data and sound data corresponding to a sound of the activity and optionally other features. For example, a kick-off in a football game can be recognized based on color histogram data corresponding to a team's uniforms and a particular region that includes colors corresponding to a football, and further based on the sound of a football being kicked.

In another mode of operation, the pattern detection module 175 can recognize content that includes a person, based on color histogram data corresponding to colors of the person's face and sound data corresponding to a voice of the person. For example, color histogram data can be used to identify a region that contains a face, facial and speaker recognition can be used together to identify an actor in a scene as Brad Pitt.

In another mode of operation, the pattern detection module 175 can recognize content that includes a place, based on color histogram data corresponding to colors of the place, image data corresponding to a recognized shape and sound data corresponding to a sound of the place. For example, the Niagara Falls can be recognized based on scene motion or texture data, a color histogram corresponding to rushing water and sound data corresponding to the sound of the falls.

The photo composition module 185 determines a selected image in the image sequence 310 by determining that the selected image includes one or more objects of interest and further that the selected image conforms to at least one of a plurality of photo composition rules. The photo composition rules can include, for example, a rule of thirds or other rule based on a relative position of the object or objects of interest in the selected image. In addition, when the object(s) of interest include one or more faces, smiling and blinking rules can optionally be applied to compose a photo where the subjects are smiling and not blinking. The photo composition rules can includes a framing rule, color rule, texture rule, a perspective rule, a simplicity rule or other rule that compares the object(s) of interest to the content of the background. In addition, the motion trajectory corresponding to an object of interest can be used in conjunction with a room for motion rule, rule of leading lines or other rule to select a well-composed photo. Once a selected image of the image sequence 310 is identified, the photo composition module outputs the selected image as photo data 115. The photo data 115 can be formatted as JPEG image, bit map or other digital image format, either compressed or uncompressed.

In addition to searching for objects of interest, pattern recognition feedback 298 in the form of pattern recognition data or other feedback from the photo generator 125 can be used to guide the encoding or transcoding performed by video codec 103. After pattern recognition, more specific structural and statistically information can be generated as pattern recognition feedback 298 that can, for instance, guide mode decision and rate control to improve quality and performance in encoding or transcoding of the video signal 110. Photo generator 125 can also generate pattern recognition feedback 298 that identifies regions with different characteristics. These more contextually correct and grouped motion vectors can improve quality and save bits for encoding, especially in low bit rate cases. After pattern recognition, estimated motion vectors can be grouped and processed in accordance with the pattern recognition feedback 298. In particular, the pattern recognition feedback 298 can be used by video codec 103 for bit allocation in different regions of an image or image sequence in encoding or transcoding of the video signal 110.

For example, when pattern recognition data from the pattern detection module 175 can indicate a face has been detected and the location of the facial region can also be used as pattern recognition feedback 298. The pattern recognition data can include facial characteristic data such as position in stream, shape, size and relative position of face, eyebrows, eyes, nose, mouth, cheekbones and jaw, skin texture and visual details of the skin (lines, patterns, and spots apparent in a person's skin), or even enhanced, normalized and compressed face images. In response, the encoder section 236 can guide the encoding of the image sequence based on the location of the facial region. In addition, pattern recognition feedback 298 that includes facial information can be used to guide mode selection and bit allocation during encoding. Further, the pattern recognition data 156 and pattern recognition feedback 298 can further indicate the location of eyes or mouth in the facial region for use by the encoder section 236 to allocate greater resolution to these important facial features. For example, in very low bit rate cases the encoder section 236 can avoid the use of inter-mode coding in the region around blinking eyes and/or a talking mouth, allocating more encoding bits should to these face areas.

Figure 5:
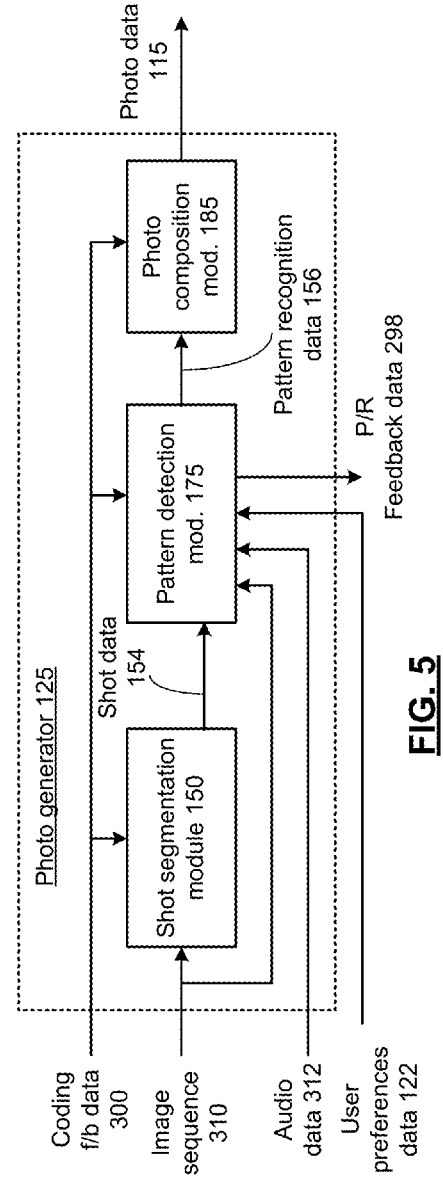
FIG. 5 presents a block diagram representation of a photo generator 125 in accordance with a further embodiment of the present disclosure.

FIG. 5 presents a block diagram representation of a photo generator 125 in accordance with a further embodiment of the present disclosure. As shown, the photo generator 125 includes a shot segmentation module 150 that segments an image sequence 310 into shot data 154 corresponding to a plurality of shots, based on the coding feedback data 300, such as shot transition data 152. The pattern detection module 175 pattern detection module 175 analyzes the shot data 154 to search for objects of interest in the images of the image sequence based optionally based on user preferences 122, audio data 312, and further based on the coding feedback data 300. The pattern detection module 175 generates pattern recognition data 156 that identifies objects of interest when present in one of the plurality of shots along with the specific location of the object(s) of interest by image and by location within the image. The pattern recognition data 156 can further include other characteristics of the object(s) of interest such as the perspective of object, one or more leading lines, lines of motions or motion trajectories, etc. The photo composition module 185 determines a selected image in the image sequence 310 by determining that the selected image includes one or more objects of interest and further that the selected image conforms to at least one of a plurality of photo composition rules.

Figure 6:
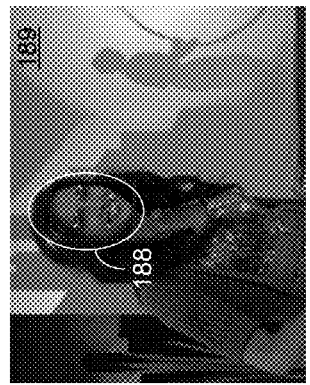
FIG. 6 presents a pictorial diagram representation of an image in accordance with a further embodiment of the present disclosure.

FIG. 6 presents a pictorial diagram representation of an image in accordance with a further embodiment of the present disclosure. In particular, an image is presented such as an image of image sequence 310 presented in conjunction with FIGS. 4-5.

As previously discussed, the photo generator 125 can track a candidate facial region over the plurality of images and detects a facial region based on an identification of facial motion in the candidate facial region over the plurality of images. The facial motion can include eye movement and the mouth movement. In particular, face candidates can be validated for face detection based on the further recognition by pattern detection module 175 of facial features, like eye blinking (both eyes blink together, which discriminates face motion from others; the eyes are symmetrically positioned with a fixed separation, which provides a means to normalize the size and orientation of the head), shape, size, motion and relative position of face, eyebrows, eyes, nose, mouth, cheekbones and jaw. Any of these facial features can be used extracted from the image sequence and used by pattern detection module 175 to determine if a subject is smiling, blinking, etc. Further, the pattern detection module 175 can employ temporal recognition to extract three-dimensional features based on different facial perspectives included in the plurality of images to improve the accuracy of the recognition of the face. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted and further used to determine if a subject is smiling, blinking, etc.

In the example shown, the facial region 188 is recognized as an object of interest in the image 189 shown. The non-blinking status of the eyes and the smile are identified. Pattern recognition data 156 is generated by the pattern detection module 175 that indicates the presence and location of the facial region 188, the non-blinking status of the eyes and the smile, and optionally the identity of the person in the image. This particular image 189 can then be analyzed by the photo composition module 185 to determine if it constitutes a well-composed photo.

Figure 7:
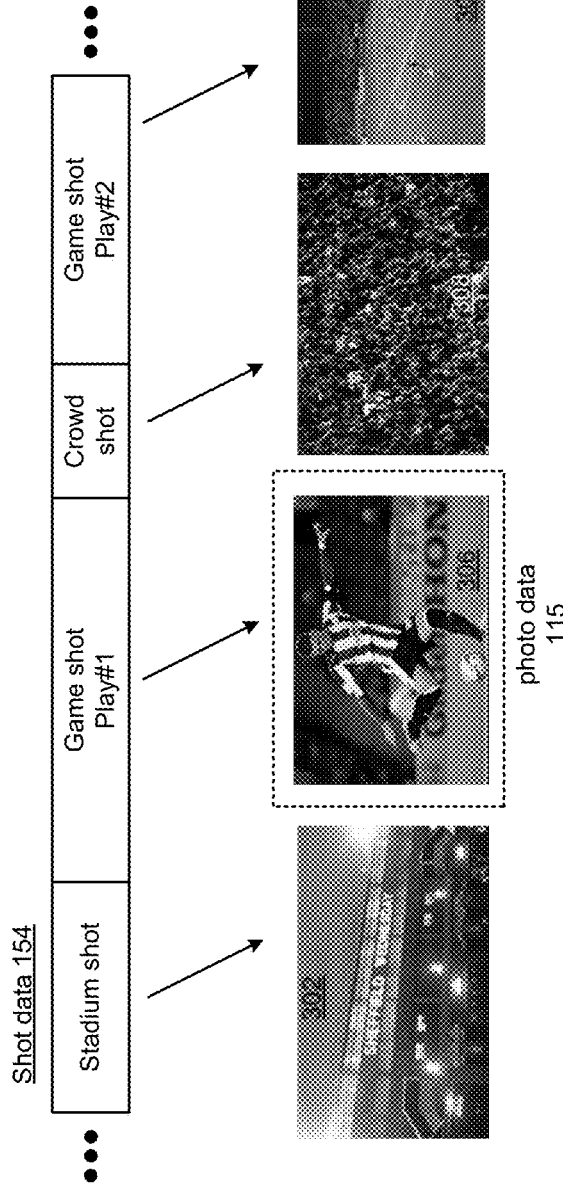
FIG. 7 presents a temporal block diagram representation of shot data 154 in accordance with a further embodiment of the present disclosure.

FIG. 7 presents a temporal block diagram representation of shot data 154 in accordance with a further embodiment of the present disclosure. In the example, presented a video signal 110 includes an image sequence 310 of a sporting event such as a Sheffield Wednesday soccer match that is processed by shot segmentation module 150 into shot data 154. Coding feedback data 300 from the video codec 103 includes shot transition data that indicates the particular images in the image sequence that fall within each of the four shots that are shown. A first shot in the temporal sequence is a stadium shot that includes image 302, the second and fourth shots are shots of the game including Play #1 and Play#2 represented by images 306 and 304, and the third shot is a shot of the crowd represented by image 308.

Consider further that the user has specified user preferences indicting an interest in a particular player and action shots. The processing system 102 identifies the player, and human activity corresponding to action shots of the player in the images of the game shot#1 and selects a well-composed image 306 from the shot to output as photo data 115.

FIG. 8 presents pictorial diagram representation of screens displays in accordance with a further embodiment of the present disclosure. In particular, screen display 190, 192 and 194 present examples of a user interface of a mobile device that includes the video processing system 102.

In screen display 190, a user is selecting user preferences, such as user preferences 122. In the example shown, the user is expressing an interest in soccer and action shots. In screen display 192, photo data has been generated, represented by image 306, in conjunction with playback of a video of a Sheffield Wednesday soccer match. The image 306 is presented to the user for evaluation. The user is given the opportunity to select whether or not the particular photo generated by the video processing system 102 should be saved. As shown in screen display 194, after the user has selected to save the photo, the user is given the opportunity to add a title to the photo, to be saved with the photo.

Figure 9:
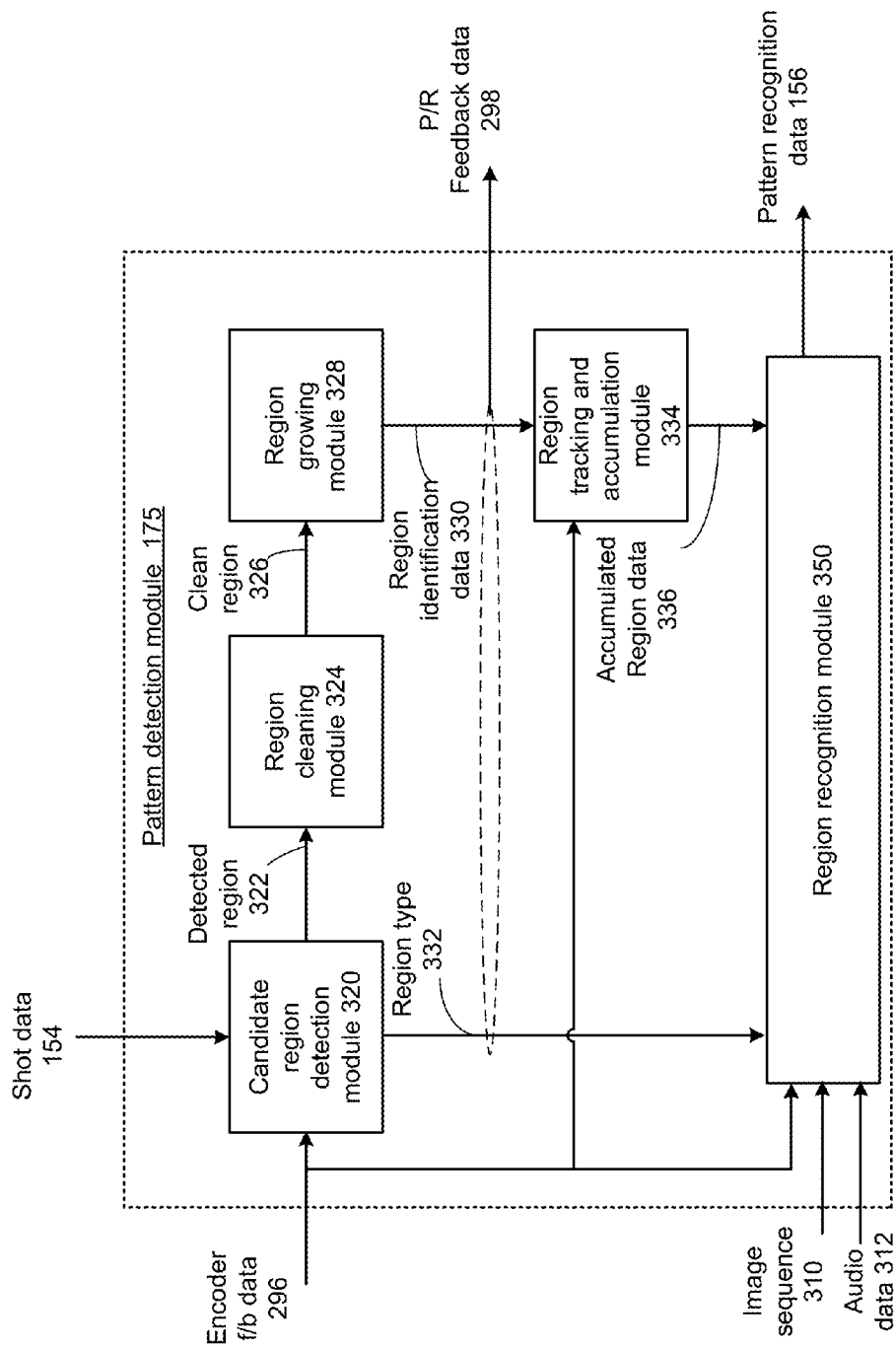
FIG. 9 presents a block diagram representation of a pattern detection module 175 in accordance with a further embodiment of the present disclosure.

FIG. 9 presents a block diagram representation of a pattern detection module 175 in accordance with a further embodiment of the present disclosure. In particular, pattern detection module 175 includes a candidate region detection module 320 for detecting a detected region 322 in at least one image of image sequence 310. In operation, the candidate region detection module 320 can detect the presence of a particular pattern or other region of interest to be recognized as a particular region type. An example of such a pattern is a human face or other face, human action, place or other object or feature. Pattern detection module 175 optionally includes a region cleaning module 324 that generates a clean region 326 based on the detected region 322, such via a morphological operation. Pattern detection module 175 further includes a region growing module 328 that expands the clean region 326 to generate a region identification data 330 that identifies the region containing the pattern of interest. The identified region type 332 and the region identification data can be output as pattern recognition feedback data 298.

Considering, for example, the case where the shot data 154 includes a human face and the pattern detection module 175 generates a region corresponding the human face, candidate region detection module 320 can generate detected region 322 based on the detection of pixel color values corresponding to facial features such as skin tones. Region cleaning module can generate a more contiguous region that contains these facial features and region growing module can grow this region to include the surrounding hair and other image portions to ensure that the entire face is included in the region identified by region identification data 330.

As previously discussed, the encoder feedback data 296 includes shot transition data, such as shot transition data 152, that identifies temporal segments in the image sequence 310 that are used to bound the shot data 154 to a particular set of images in the image sequence 310. The candidate region detection module 320 further operates based on motion vector data to track the position of candidate region through the images in the shot data 154. Motion vectors, shot transition data and other encoder feedback data 296 are also made available to region tracking and accumulation module 334 and region recognition module 350. The region tracking and accumulation module 334 provides accumulated region data 336 that includes a temporal accumulation of the candidate regions of interest to enable temporal recognition via region recognition module 350. In this fashion, region recognition module 350 can generate pattern recognition data 156 based on such features as facial motion, human actions, three-dimensional modeling and other features recognized and extracted based on such temporal recognition.

Figure 10:
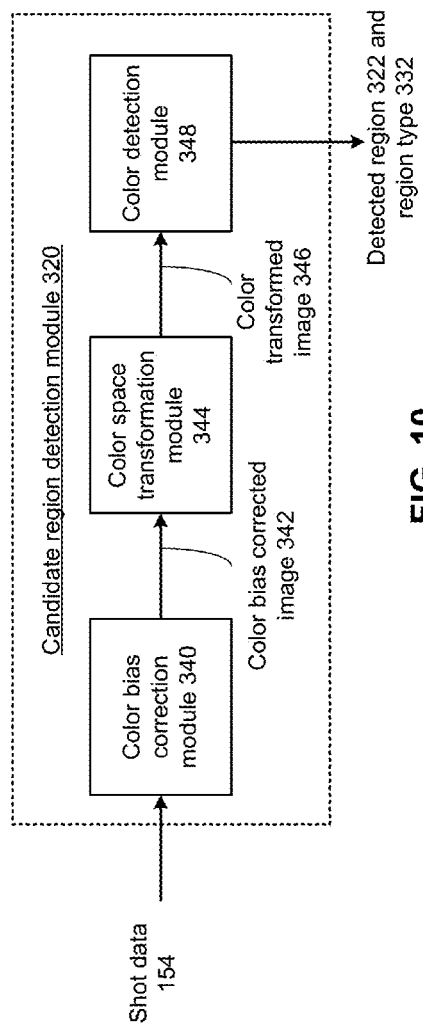
FIG. 10 presents a block diagram representation of a candidate region detection module 320 in accordance with a further embodiment of the present disclosure.

FIG. 10 presents a block diagram representation of a candidate region detection module 320 in accordance with a further embodiment of the present disclosure. In this embodiment, region detection module 320 operates via detection of colors in image sequence 310. Color bias correction module 340 generates a color bias corrected image 342 from image sequence 310. Color space transformation module 344 generates a color transformed image 346 from the color bias corrected image 342. Color detection module generates the detected region 322 from the colors of the color transformed image 346.

For instance, following with the examples previously discussed where human faces are detected, color detection module 348 can operate to detect colors in the color transformed image 346 that correspond to skin tones using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a detected region 322 based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present disclosure.

Figure 11:
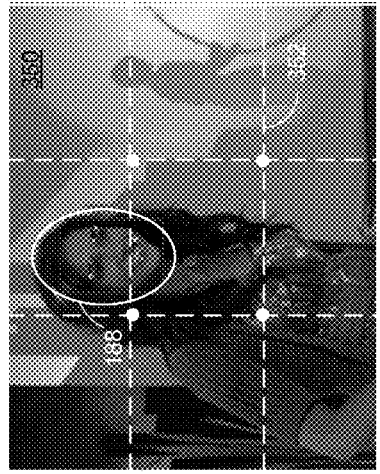
FIG. 11 presents a pictorial representation of an image 350 in accordance with a further embodiment of the present disclosure.

FIG. 11 presents a pictorial representation of an image 350 in accordance with a further embodiment of the present disclosure. In particular, an example image 350 is presented. As previously discussed, the photo composition module 185 determines a selected image in an image sequence by determining that the selected image includes one or more objects of interest and further that the selected image conforms to at least one of a plurality of photo composition rules.

In particular, consider a set of n composition rules (R1, R2, R3 . . . Rn), the photo composition module 185 determines that a photo is well-composed based on the logical variable P, where $$P=f(R1,R2,R3 \ldots Rn)$$

In an embodiment, the function $f$ requires that each of the set of composition rules (R1, R2, R3 . . . Rn) be satisfied— however other functions can be used that require that some number (less than n) of the rules be satisfied, or that determine the value of P based on a weighted combination of the rules. Other functions can likewise be employed.

In this example, the image 350 includes a recognized face in the region indicated by 188, as indicated by pattern recognition data 156 from the pattern detection module 175. The photo composition module applies a perspective rule, a blinking rule, a smiling rule, and a rule of thirds based on pattern recognition data 156 and/or other analysis of the image 350 and the surrounding images—requiring that all rules be satisfied for a well-composed photo. The photo composition module 185 determines that the subject is smiling and that the eyes are not blinking Three-dimension modelling indicates the direction that the subject is facing and a perspective rule is applied and determines that the direction falls within an acceptable range. A rule of thirds is applied based on a relative position of the region 188 in the selected image. In particular, the location of the region 188 is compared with the grid 352. Because the region 188 does not intersect any of the four points of intersection of the grid 352 (indicated by dots) the rule of thirds is not satisfied and the particular image is not selected.

The photo composition rules discussed above are merely examples of the range of photo composition rules that can be applied. As previously discussed, the photo composition rules can includes a framing rule that determines if detected object(s) are properly framed by the remaining portions of the image; a color rule that compares the color of detected object(s) to the remaining portions of the image, a texture rule that looks a background texture, a simplicity rule that looks at the complexity of either the background or the overall image, etc. In addition, rules based on leading lines of motion trajectories can also be employed.

Figure 12:
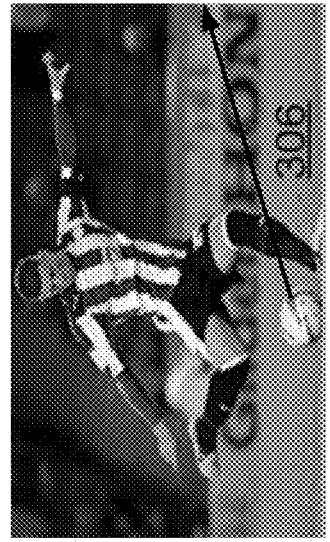
FIG. 12 presents a pictorial representation of an image 306 in accordance with a further embodiment of the present disclosure.

FIG. 12 presents a pictorial representation of an image 306 in accordance with a further embodiment of the present disclosure. In particular, an image 306 is presented with a recognized human action and an object—in this case, a soccer ball. Coding feedback is used by pattern detection module 175 to generate pattern recognition data 156 that indicates not only a region that includes the soccer ball, but also a motion trajectory for the ball (indicated by the arrow superimposed on the image). The photo composition module 185 applies a room for motion rule that looks to see that the image includes sufficient space to encompass the motion that would be expected by a viewer by comparing the distance along the motion trajectory from the ball to the nearest picture boundary. In the case shown, the photo passes the room for motion rule because the distance along the motion trajectory from the ball to the nearest picture boundary is greater than a threshold value (e.g. 10% of the screen width or height, 15% of the screen width or height, or some other threshold).

Figure 13:
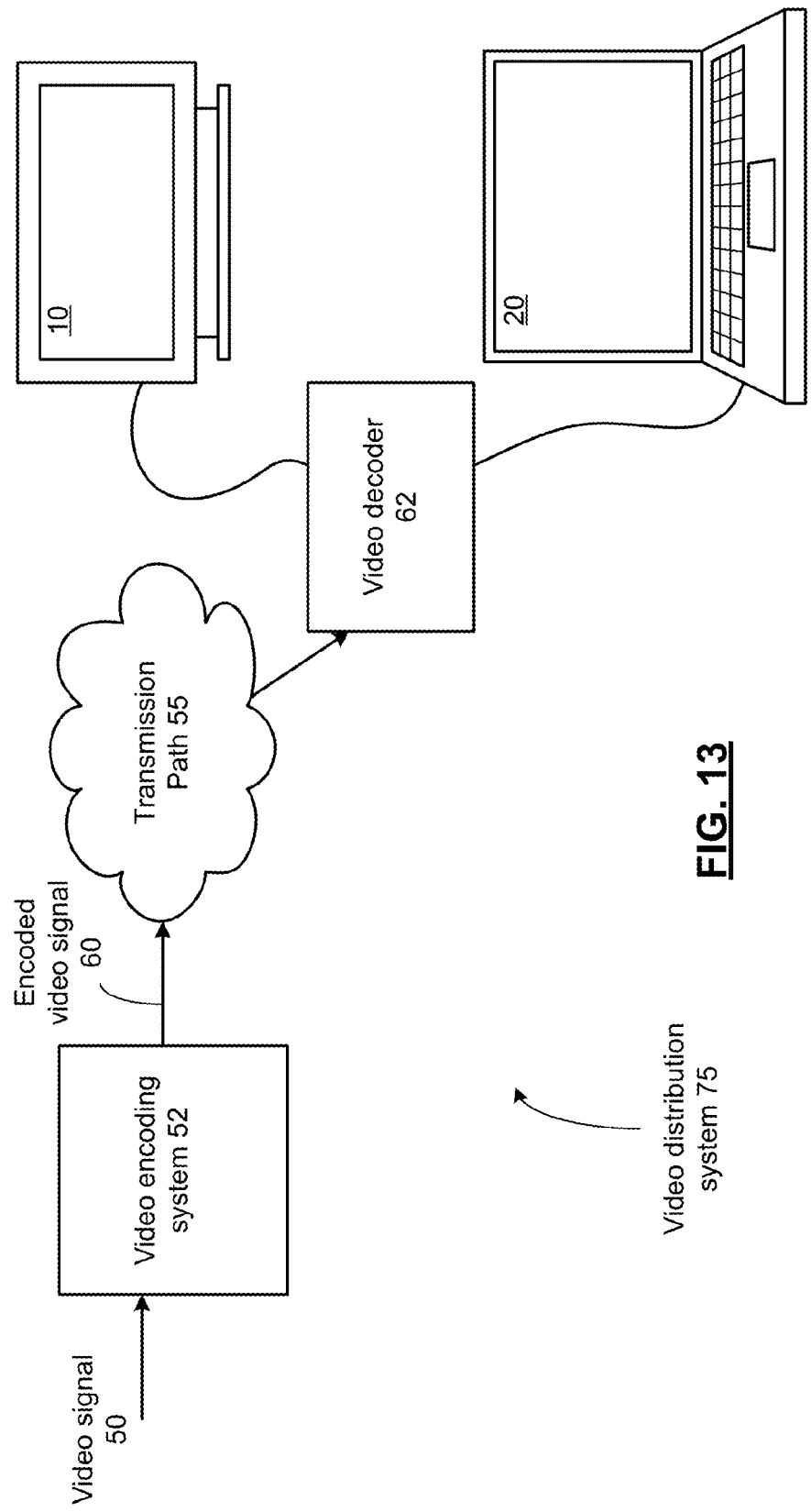
FIG. 13 presents a block diagram representation of a video distribution system 75 in accordance with an embodiment of the present disclosure.

FIG. 13 presents a block diagram representation of a video distribution system 75 in accordance with an embodiment of the present disclosure. In particular, a video signal 50 is encoded by a video encoding system 52 into encoded video signal 60 for transmission via a transmission path 55 to a video decoder 62. Video decoder 62, in turn can operate to decode the encoded video signal 60 for display on a display device such as television 10, computer 20 or other display device. The video processing system 102 can be implemented as part of the video encoder 52 or the video decoder 62 to generate photo data 115 from the content of video signal 50.

The transmission path 55 can include a wireless path that operates in accordance with a wireless local area network protocol such as an 802.11 protocol, a WIMAX protocol, a Bluetooth protocol, etc. Further, the transmission path 55 can include a wired path that operates in accordance with a wired protocol such as a Universal Serial Bus protocol, an Ethernet protocol or other high speed protocol.

Figure 14:
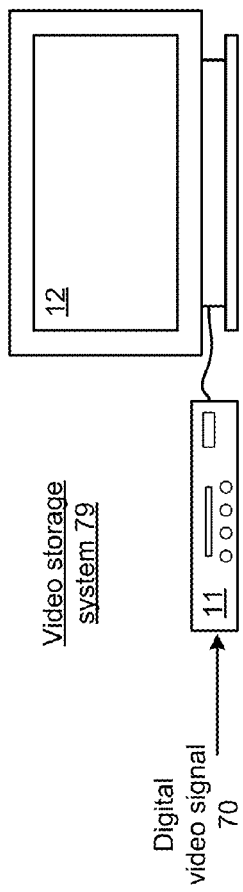
FIG. 14 presents a block diagram representation of a video storage system 79 in accordance with an embodiment of the present disclosure.

FIG. 14 presents a block diagram representation of a video storage system 79 in accordance with an embodiment of the present disclosure. In particular, device 11 is a set top box with built-in digital video recorder functionality, a standalone digital video recorder, a DVD recorder/player or other device that records or otherwise stores a digital video signal 70 for display on video display device such as television 12. The video processing system 102 can be implemented in device 11 as part of the encoding, decoding or transcoding of the stored video signal to generate the photo data 115.

While these particular devices are illustrated, video storage system 79 can include a hard drive, flash memory device, computer, DVD burner, or any other device that is capable of generating, storing, encoding, decoding, transcoding and/or displaying a video signal or photo data 115 in accordance with the methods and systems described in conjunction with the features and functions of the present disclosure as described herein.

Figure 15:
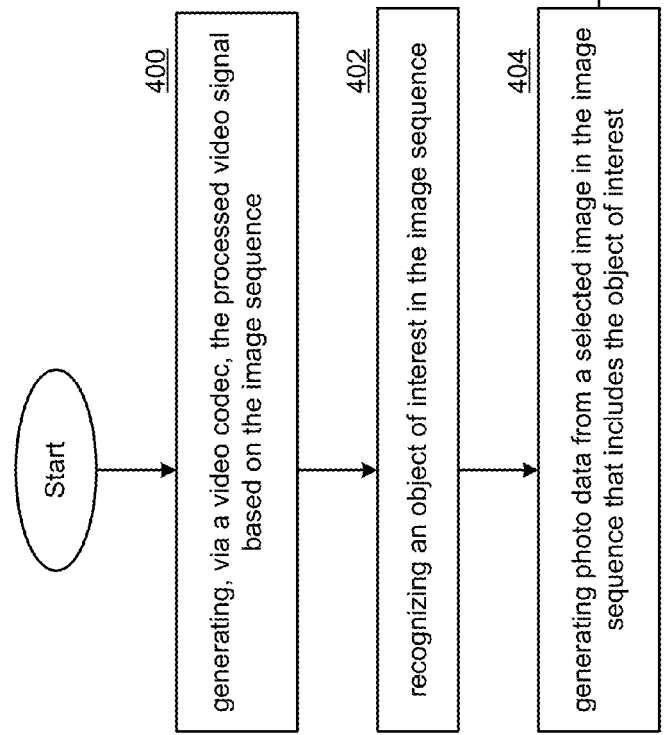
FIG. 15 presents a flowchart representation of a method in accordance with an embodiment of the present disclosure.

FIG. 15 presents a flowchart representation of a method in accordance with an embodiment of the present disclosure. In particular a method is presented for use in conjunction with one more functions and features described in conjunction with FIGS. 1-14. Step 400 includes generating, via a video codec, the processed video signal based on the image sequence. Step 402 includes recognizing an object of interest in the image sequence. Step 404 includes generating photo data from a selected image in the image sequence that includes the object of interest.

In an embodiment, step 402 is based on coding feedback data from the video codec. Step 402 can also be based on recognizing the object of interest in the image sequence is based on a temporal recognition performed over the plurality of images. The object of interest can be specified based on user preference data and can includes a person, a place, a thing and/or an activity.

In an embodiment, the method further includes determining the selected image in the image sequence by determining that the selected image includes the object of interest and that the selected image conforms to at least one of a plurality of photo composition rules. Determining that the selected image conforms to at least one of a plurality of photo composition rules can be based on a relative position of the object of interest in the selected image, based on a motion trajectory in the selected image, and/or based on other criteria.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for processing a video signal into a processed video signal, the video signal including an image sequence and associated audio data formatted in a compressed video format, the system comprising:
a video codec configured to generate the processed video signal based on the image sequence; and
a photo generation module, coupled to the video codec, including a processor configured to recognize an object of interest in the image sequence and generate photo data, formatted in a digital still image format that is distinct from the compressed video format, the photo data corresponding to a photograph generated from a selected image in the image sequence, wherein the photo generation module includes a photo composition module that identifies the selected image in the image sequence as including a selected region that includes the object of interest, wherein the selected image is further identified by determining the selected image conforms to at least one of a plurality of photo composition rules, and wherein the at least one of a plurality of photo composition rules includes a rule of thirds that includes determining that the selected region that includes the object of interest intersects one of four points on the selected image, wherein each of the four points on the selected image corresponds to an intersection of a horizontal grid line of a rule of thirds grid and a vertical grid line of the rule of thirds grid.

2. The system of claim 1 wherein the photo generation module recognizes the object of interest in the image sequence based on coding feedback data from the video codec.

3. The system of claim 1 wherein the photo generation module recognizes the object of interest in the image sequence based on a temporal recognition performed over a plurality of images.

4. The system of claim 1 wherein the object of interest is specified based on user preference data that indicates the object of interest to appear in the photograph.

5. The system of claim 4 wherein the object of interest includes one of: a person, a place, a thing or an activity.

6. The system of claim 1 wherein the at least one of the plurality of photo composition rules includes a simplicity rule that includes comparing the object of interest to background content depicted in the image.

7. The system of claim 1 wherein the object of interest includes a face and the at least one of the plurality of photo composition rules further includes a perspective rule, a blinking rule, and a smiling rule.

8. The system of claim 1 wherein the at least one of the plurality of photo composition rules includes a room for motion rule that operates based on a motion trajectory in the selected image.

9. A method for processing a video signal into a processed video signal, the video signal including an image sequence and associated audio data formatted in a compressed video format, the method comprising:
generating, via a video codec, the processed video signal based on the image sequence;
recognizing an object of interest in the image sequence; and
generating photo data, formatted in a digital still image format that is distinct from the compressed video format, the photo data corresponding to photograph generated from a selected image in the image sequence wherein the selected image is identified in the image sequence as including a selected region that includes the object of interest, wherein the selected image is further identified by determining the selected image conforms to at least one of a plurality of photo composition rules, and wherein the at least one of a plurality of photo composition rules includes a rule of thirds that includes determining that the selected region that includes the object of interest intersects one of four points on the selected image, wherein each of the four points on the selected image corresponds to an intersection of a horizontal grid line of a rule of thirds grid and a vertical grid line of the rule of thirds grid.

10. The method of claim 9 wherein recognizing the object of interest in the image sequence is based on coding feedback data from the video codec.

11. The method of claim 9 wherein recognizing the object of interest in the image sequence is based on a temporal recognition performed over a plurality of images.

12. The method of claim 9 wherein the object of interest is specified based on user preference data.

13. The method of claim 12 wherein the object of interest includes one of: a person, a place, a thing or an activity.

14. The method of claim 9
wherein the at least one of the plurality of photo composition rules includes a simplicity rule that includes comparing the object of interest to background content depicted in the image.

15. The method of claim 9 wherein the object of interest includes a face and the at least one of the plurality of photo composition rules further includes a perspective rule, a blinking rule, and a smiling rule.

16. The method of claim 9 wherein the at least one of the plurality of photo composition rules includes a room for motion rule that operates based on a motion trajectory in the selected image.

17. The system of claim 1 wherein the at least one of the plurality of photo composition rules a color rule that includes comparing a color of the object of interest to a color of background content depicted in the image.

* * * * *